US006963458B2

(12) United States Patent
Lamberts

(10) Patent No.: US 6,963,458 B2
(45) Date of Patent: Nov. 8, 2005

(54) METHOD AND APPARATUS FOR REDUCING THE SERVO POSITION ERROR SIGNAL NON-LINEARITY DURING SELF-SERVO WRITING IRRESPECTIVE OF THE HEAD WIDTH

(75) Inventor: Bernd Lamberts, Cupertino, CA (US)

(73) Assignee: Hitachi Global Storage Technologies, Netherlands B.V., (NL)

( * ) Notice: Subject to any disclaimer, the term of this patent is extended or adjusted under 35 U.S.C. 154(b) by 481 days.

(21) Appl. No.: 10/086,579

(22) Filed: Feb. 28, 2002

(65) Prior Publication Data

US 2003/0161061 A1   Aug. 28, 2003

(51) Int. Cl.$^7$ ............................ G11B 27/36; G11B 5/09
(52) U.S. Cl. ............................ 360/31; 360/39; 360/46; 360/75; 360/78.14
(58) Field of Search ...................... 360/46, 68, 45, 360/31, 67, 53, 55, 78.04, 75, 39, 78.14

(56) References Cited

U.S. PATENT DOCUMENTS

| | | | |
|---|---|---|---|
| 4,414,589 A | 11/1983 | Oliver et al. | |
| 4,688,118 A | 8/1987 | Knowles et al. | |
| 4,912,576 A | 3/1990 | Janz | |
| 5,241,435 A | 8/1993 | Saito et al. | |
| 5,416,652 A | 5/1995 | Lewis | |
| 5,448,429 A | 9/1995 | Cribbs et al. | |
| 5,541,784 A | 7/1996 | Cribbs et al. | |
| 5,570,247 A | 10/1996 | Brown | |
| 5,659,436 A | 8/1997 | Yarmchuk et al. | |
| 5,949,603 A | 9/1999 | Brown et al. | |
| 6,040,955 A | 3/2000 | Brown et al. | |
| 6,198,583 B1 * | 3/2001 | Ohinata et al. | 360/46 |

FOREIGN PATENT DOCUMENTS

JP   53-74008   7/1978

(Continued)

OTHER PUBLICATIONS

Jackson et al, "A Novel Way of Formatting to Accommodate Variations in Heads And Media," IEEE Transactions on Magnetics, vol. 24, No. 6, Nov. 1998, pp. 2958-2960.

(Continued)

Primary Examiner—David Hudspeth
Assistant Examiner—Natalia Figueroa
(74) Attorney, Agent, or Firm—Chambliss, Bahner & Stophel, P.C.; David W. Lynch

(57) ABSTRACT

A method and apparatus for reducing the servo position error signal non-linearity during self-servo writing irrespective of the head width is disclosed. Write current of each head is modified based upon the head width. The write width for all heads is measured and a write current for each head in a disk drive is adjusted toward a predetermined level. A mean track propagation width for the disk drive is determined, wherein the predetermined level establishes the determined mean track propagation. A mean head width is determined and the write current for each head is adjusted by applying a higher write current to heads smaller than the mean head width and a lower write current to heads wider than the mean head width. Optimal performance is achieved using the adjusted write currents. The measuring of the head width is repeated and the write current is adjusted until a track propagation for the disk drive meets a predetermined criteria. The predetermined criteria includes a predetermined minimum threshold or a minimum variance in track propagation width.

12 Claims, 5 Drawing Sheets

FOREIGN PATENT DOCUMENTS

| | | |
|---|---|---|
| JP | 64-70909 | 3/1989 |
| JP | 64-76403 | 3/1989 |
| JP | 4-181502 | 6/1992 |
| JP | 7-14107 | 1/1995 |
| JP | 8-273316 | 10/1996 |
| JP | 9-102103 | 4/1997 |
| JP | 9-138926 | 5/1997 |

OTHER PUBLICATIONS

"Compensation of Head Tolerance," IBM Technical Disclosure Bulletin, vol. 37, No. 4A, Apr. 1994, pp. 677, 678.

"Hard Disk Drive Servo Track Writing Method With Adaptive Write Current," IBM Technical Disclosure Bulletin, vol. 40, No. 7, Jul. 1997, pp. 175-178.

* cited by examiner

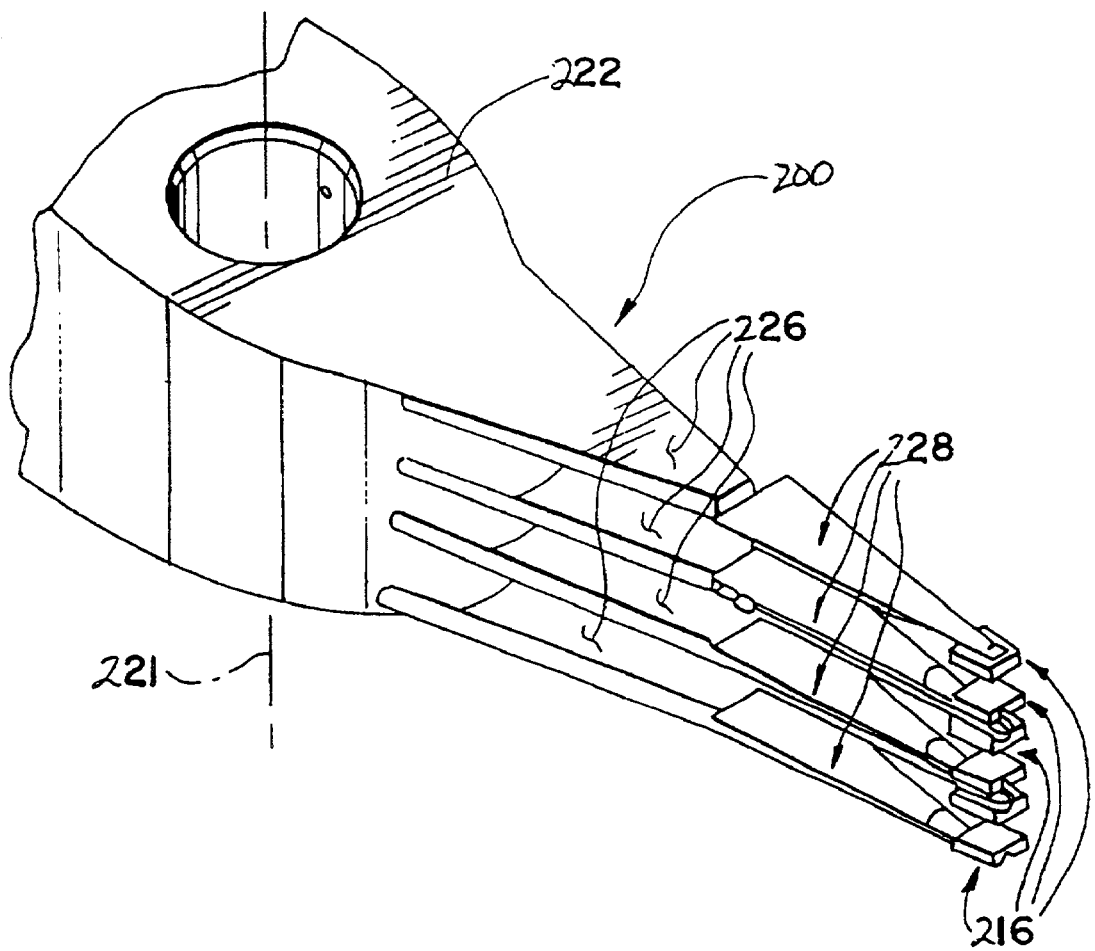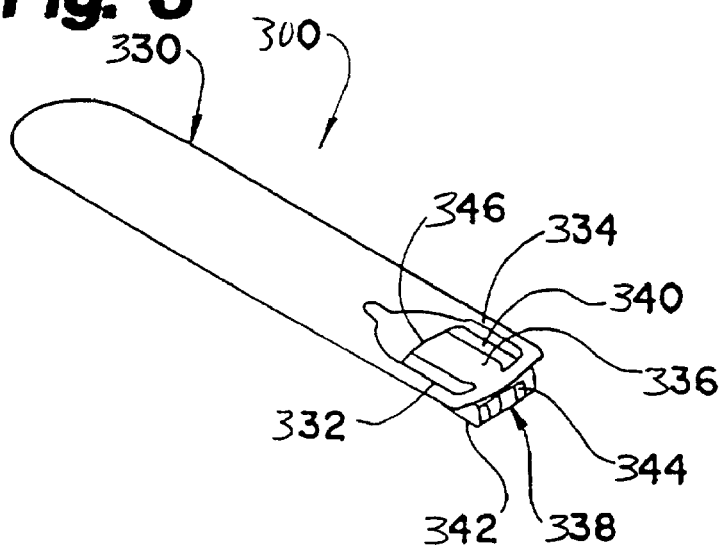

METHOD AND APPARATUS FOR REDUCING THE SERVO POSITION ERROR SIGNAL NON-LINEARITY DURING SELF-SERVO WRITING IRRESPECTIVE OF THE HEAD WIDTH

BACKGROUND OF THE INVENTION

1. Field of the Invention

This invention relates in general to a direct address storage device (DASD), and more particularly to a method and apparatus for reducing the servo position error signal non-linearity during self-servo writing irrespective of the head width.

2. Description of Related Art

Increased levels of storage capacity in floppy and hard disk drives are a direct result of the higher track densities possible with voice-coil and other types of servo positioners as well as the ability to read and write narrower tracks by using, for example, magneto resistive (MR) head technology. Previously, low track density disk drives were able to achieve satisfactory head positioning with leadscrew and stepper motor mechanisms. However, when track densities are so great that the mechanical error of a leadscrew-stepper motor combination is significant compared to track-to-track spacing, an embedded servo is needed so that the position of the head can be determined from the signals it reads.

Conventional hard disk manufacturing techniques including writing servo tracks on the media of a head disk assembly (HDA) with a specialized servo writer instrument. Laser positioning feedback is used in such instruments to read the actual physical position of a recording head used to write the servo tracks. Unfortunately, it is becoming more and more difficult for such servo writers to invade the internal environment of a HDA for servo-writing because the HDAs themselves are exceedingly small and depend on their covers and castings to be in place for proper operation. Some HDAs are the size and thickness of a plastic credit card. At such levels of microminiaturization, traditional servo-writing methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be between seventeen to sixty, or even more, sectors per track, that same number of servo data areas must be dispersed around a data track. These servo-data areas allow a head to follow a track center line around a disk, even when the track is out of round, as can occur with spindle wobble, disk slip and/or thermal expansion. As technology advances to provide smaller disk drives, and increased track densities, the placement of servo data must also be proportionately more accurate.

In magnetic disk drives, magnetic heads and recorded servo code in a track following servo mode are used for keeping the magnetic heads track centered during reading operations. The magnetic heads comprise a magnetic core having an air gap therein and having a coil wound thereon. These magnetic cores vary in effective magnetic widths due to their design and due to the manufacturing process. These physical variations among the magnetic heads result in variations in servo gain when they are individually connected in the servo loop.

The propagation width for the disk drive is selected according to the widest head to scale the erase bands near a constant. This implies, given a certain distribution in the components, a degradation in servo position error signal (PES) linearity due to very narrow heads.

It can be seen that there is a need for reducing the servo position error signal non-linearity during self-servo writing irrespective of the head width.

SUMMARY OF THE INVENTION

To overcome the limitations in the prior art described above, and to overcome other limitations that will become apparent upon reading and understanding the present specification, the present invention discloses a method and apparatus for reducing the servo position error signal non-linearity during self-servo writing irrespective of the head width.

The present invention solves the above-described problems by providing a method and apparatus that modifies the write current of the head based upon the head width.

A method in accordance with the principles of the present invention includes measuring the write width for all heads and adjusting a write current for each head in a disk drive toward a predetermined level.

Other embodiments of a method in accordance with the principles of the invention may include alternative or optional additional aspects. One such aspect of the present invention is that the method further includes determining a mean track propagation width for the disk drive, wherein the predetermined level establishes the determined mean track propagation.

Another aspect of the present invention is that the measuring further comprises determining a mean head width and the adjusting further comprises adjusting the write current for each head by applying a higher write current to heads smaller than the mean head width and a lower write current to heads wider than the mean head width.

Another aspect of the present invention is that the method further includes verifying the optimal performance is achieved using the adjusted write currents.

Another aspect of the present invention is that the verifying further comprises repeating the measuring and adjusting until a track propagation for the disk drive meets a predetermined criteria.

Another aspect of the present invention is that the predetermined criteria comprises a predetermined minimum threshold.

Another aspect of the present invention is that the predetermined criteria comprises a minimum variance in track propagation width.

In yet another embodiment of the present invention, a disk drive is provided. The disk drive includes a plurality of data storage media mounted for simultaneous rotation about an axis, an actuator for moving each of a plurality of heads relative to an associated data storage media for reading and writing data to the associated data storage media and a disk controller for writing a data pattern to respective data storage media utilizing each of the plurality of heads, wherein the disk controller measures the write width for each of the plurality of heads and adjusts a write current for each of the plurality of heads toward a predetermined level.

Another aspect of the present invention is that the disk controller determines a mean track propagation width for the disk drive, the predetermined level establishing a mean track propagation.

Another aspect of the present invention is that the disk controller measures the write width for each of the plurality of heads by determining a mean head width and adjusting the write current for each of the plurality of heads by applying a higher write current to heads smaller than the mean head width and a lower write current to heads wider than the mean head width.

Another aspect of the present invention is that the disk controller further verifies that optimal performance is achieved using the adjusted write currents.

Another aspect of the present invention is that the disk controller verifies that optimal performance is achieved by repeating the measuring and adjusting until a track propagation for the disk drive meets a predetermined criteria.

Another aspect of the present invention is that the predetermined criteria comprises a predetermined minimum threshold.

Another aspect of the present invention is that the predetermined criteria comprises a minimum variance in track propagation width.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a perspective view of actuator assembly according to the present invention;

FIG. 3 illustrates an enlarged view of a head gimbal assembly according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for reducing the servo position error signal non-linearity during self-servo writing irrespective of the head width. The method and apparatus modifies the write current of the head based upon the head width.

Figure 1:
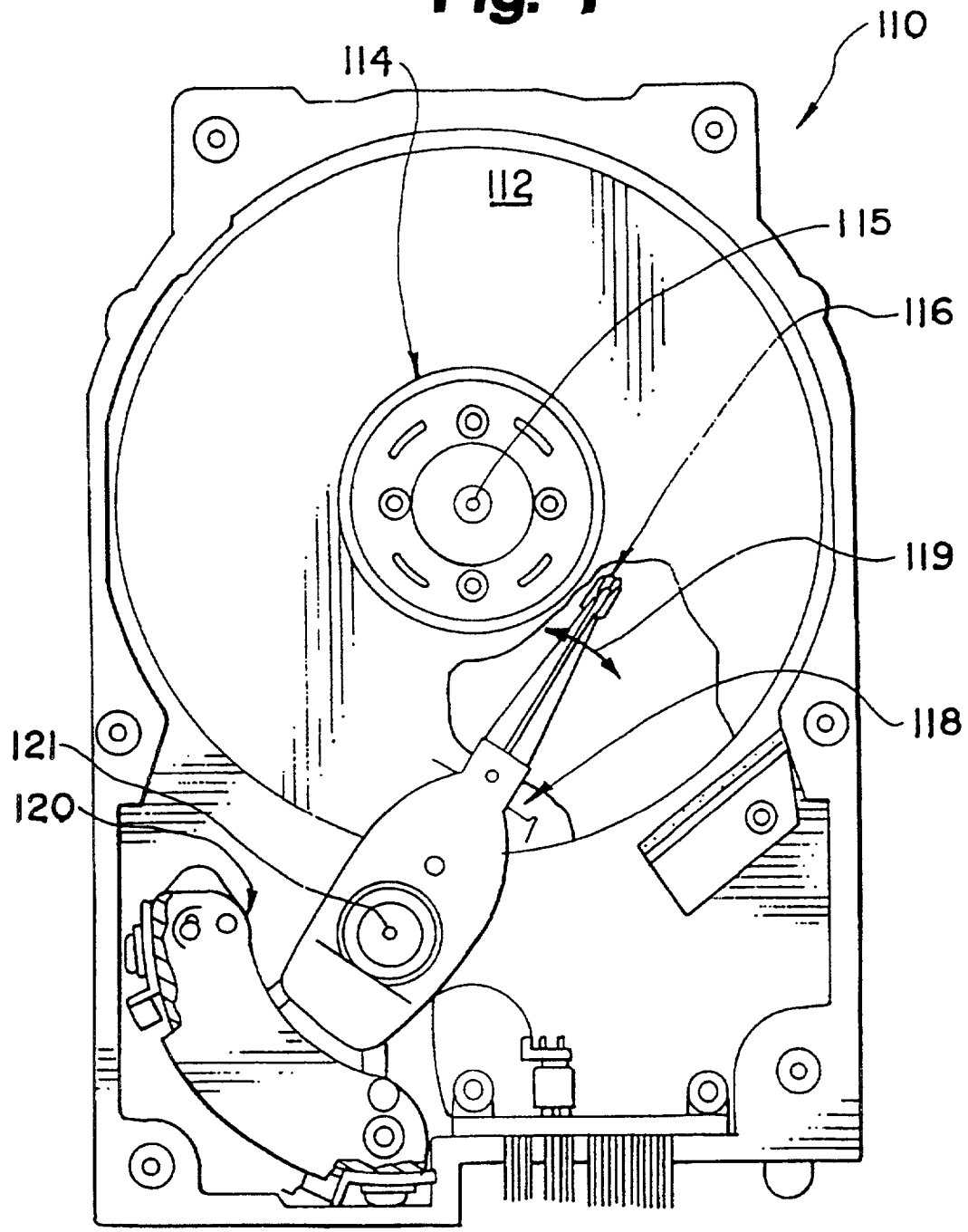
FIG. 1 illustrates a plan view of a disk drive according to the present invention.

FIG. 1 is a plan view of a disk drive 100 according to the present invention. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116 which is mounted to an actuator assembly 118 in disk drive 100. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disk surfaces, under the control of electronic circuitry housed within disk drive 100.

More specifically, actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

FIG. 2 is a perspective view of actuator assembly 200. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342. Transducers 344 are also preferably located on a leading edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

Figure 4:
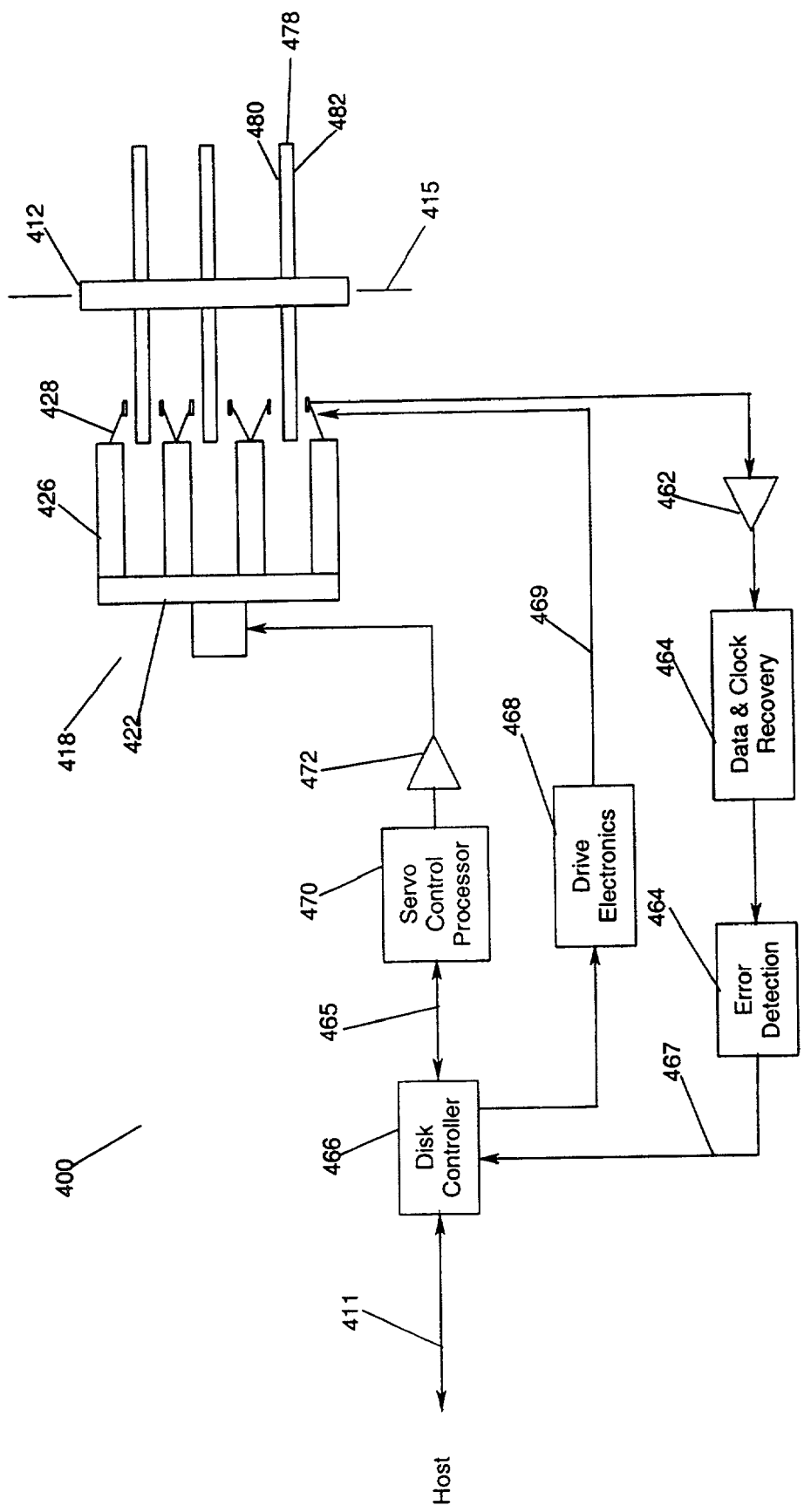
FIG. 4 is a block diagram of a portion of a disk drive, which illustrates a servo position control circuit in accordance with one aspect of the present invention.

FIG. 4 is a block diagram of a portion of a disk drive 400, which illustrates a servo position control circuit in accordance with one aspect of the present invention. The portion of disk drive 400 which is illustrated in FIG. 4 includes actuator assembly 418, disk pack 412, preamplifier 460, data and clock recovery circuit 462, error detection circuit 464, drive controller 466, drive electronics 468, servo control processor 470 and power amplifier 472.

Drive controller 466 is preferably a microprocessor or digital computer, or other suitable microcontroller, and is coupled by bus 411 to a host system or another drive controller which controls the drive.

Disk pack 412 includes spindle 476 which supports a plurality of coaxially arranged disks 478. Each disk 478 is mounted for rotation with spindle 476 about axis of rotation 415. Each disk 478 has a first surface 480 and a second surface 482. Surfaces 480 and 482 include concentric tracks for receiving and storing data in the form of flux reversals encoded on the tracks.

Actuator assembly 418 includes base portion 422 supporting the plurality of actuator arms 426. Each of the actuator arms 426 is coupled to at least one of the load beams 428. Load beams 428, in turn, each support one of the head gimbal assemblies 416 (labeled in FIG. 3) above corresponding disk surfaces 480 or 482 for accessing data within the tracks on the disk surface.

In operation, drive controller 412 typically receives a command signal from a host system which indicates that a certain portion of one or more of disks 478 are to be accessed. In response to the command signal, drive controller 466 provides servo control processor 470 with a position (or reference) signal 465 which indicates a particular cylinder over which actuator assembly 418 is to position head gimbal assemblies 416. Servo control processor 470 converts the position signal into an analog signal which is amplified by power amplifier 472 and is provided to the voice coil motor in actuator assembly 418. In response to the analog position signal, actuator assembly 418 positions load beams 428 and their associated head gimbal assemblies 416 over a desired cylinder.

The head gimbal assemblies 416 generate a read signal containing data from embedded servo position data which is stored on a selected portion of each track of the disk to be read, as well as normal data to be accessed from the selected portion of the disk to be read. The read signal is provided to preamplifier 460 which amplifies the read signal and provides it to data and clock recovery circuit 462. Data and clock recovery circuit 462 recovers data from the read signal, which is encoded on the disk surface when the data is written to the disk surface, in a known manner. Of course, data and clock recovery circuit 462 can be a partial response maximum likelihood (PRML) channel, or another suitable type of read channel.

Once the data is recovered, it is provided to error detection circuit 464 which detects whether any errors have occurred in the data read back from the disk and which provides an output 467. Errors are corrected by error detection circuit 464 or drive controller 466, or a combination of both, in a known manner.

During head positioning, drive controller 466 provides a position signal to servo control processor 470 causing actuator assembly 418 to position head gimbal assemblies 416 over a selected cylinder. In a sector servo positioning drive (or an embedded servo positioning drive), a portion of each sector on the disk surfaces has position information which is encoded thereon and which is read by the data head and provided, through the read channel, to servo control processor 470. The positioning information not only gives coarse position information indicating the particular track over which the data head is flying, it also provides tuning feedback to the servo control processor for better positioning. Servo control processor 470 reacts to the position information read from the disk and positions the head gimbal assemblies 416 accordingly.

In order to write information to the disks, drive controller 466 receives not only the location of the information to be written on disk pack 412, but also receives the actual data to be written. the location information is provided to servo control processor 470 (and optionally microactuator controller(s) 474) as a reference signal to coarsely position the data heads relative to the corresponding disk surfaces. Then, drive controller 466 provides the data to be written to data conditioning circuitry 468, which in turn provides that information at an output 469 to the particular transducers on the head gimbal assemblies 416 so that the data can be written to the disk surfaces, in a known manner.

In the preferred embodiment, the read channel provided in disk drive 400 (which in the embodiment shown in FIG. 4 includes preamp 460, data and clock recovery circuit 462 and error detection circuit 464) is capable of receiving a plurality of simultaneous and parallel data signals and processing those data signals in parallel, and providing them to the host system, and/or drive controller 466 in parallel. Further, in the preferred embodiment, drive electronics 468 is also preferably suitable for providing a plurality of simultaneous and parallel write signals to the data heads to execute a simultaneous and parallel write operation. Further, in the preferred embodiment, servo controller processor 470 is suitable for simultaneously providing positioning signals to actuator 418 to simultaneously aligned a plurality of heads with tracks on a plurality of disk surfaces in disk pack 412.

Figure 5:
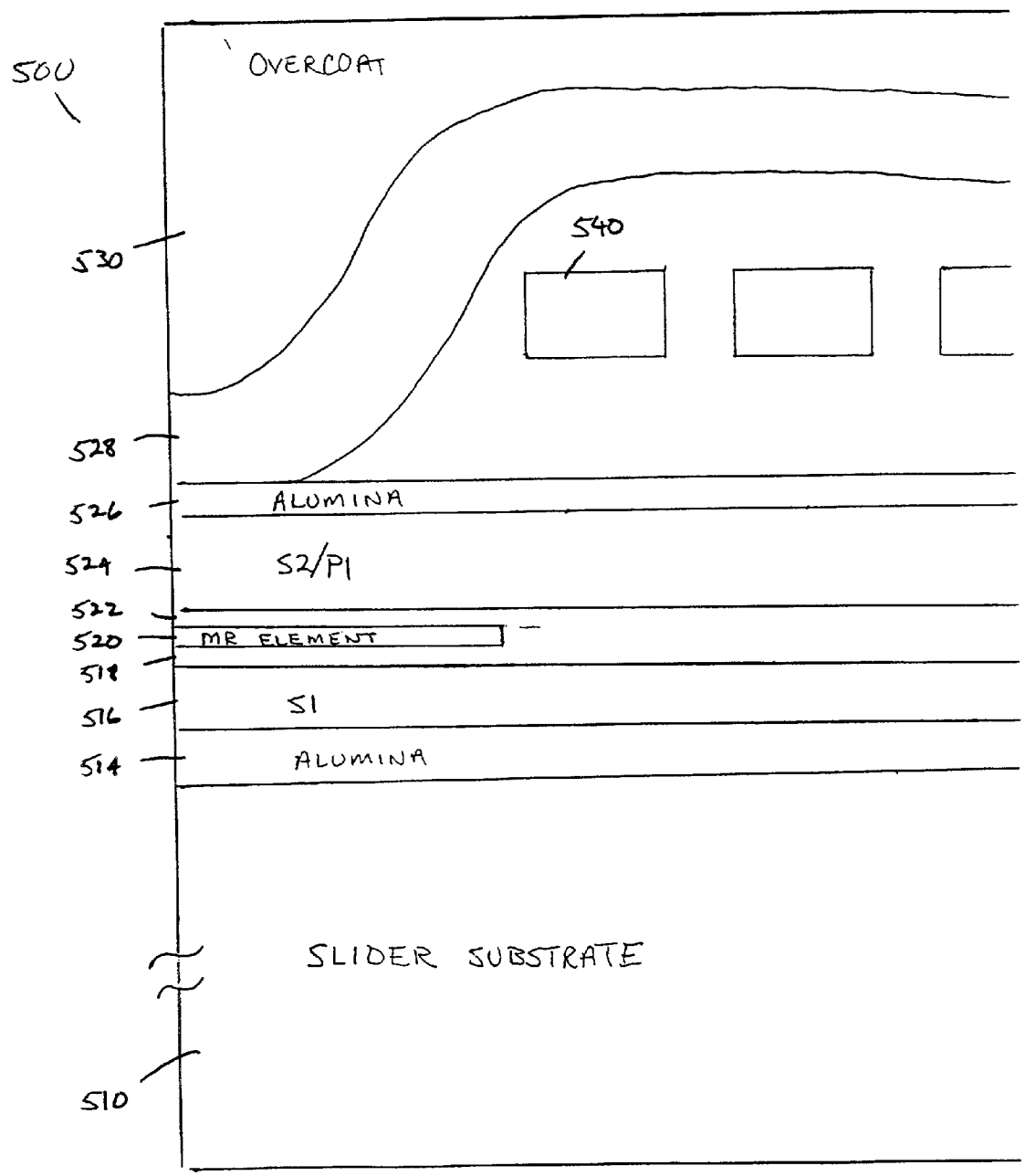
FIG. 5 illustrates a side view of one example of a magnetic head.

However, as described above, magnetic heads and recorded servo code in a track following servo mode are used for keeping the magnetic heads track centered during reading operations. FIG. 5 illustrates a side view of one example of a magnetic head 500. In FIG. 5, a merged read/write head 500 is illustrated. However, those skilled in the art will recognize that the present invention is not meant to be limited to any particular type of magnetic head. FIG. 5 illustrates that the read/write head 500 includes a slider substrate 510, an optional, thin adhesion promotion layer 512, an undercoat layer 514, a first shield layer 516 (typically Sendust), a first insulating layer 518, a magnetoresistive element 520, a second insulating layer 522, a second shield/first pole layer 524, a write gap 526, a second pole layer 528 and an overcoat layer 530.

As shown in FIG. 5, the first 516 and second 524 shield layers provide a flux shield for the magnetoresistive element 520 to prevent magnetic flux from adjacent tracks on a recording medium from being detected by the magnetoresistive element 520. The overcoat 530 is formed over the second pole layer 528 to cover the second pole layer 528 and write coils 540 are formed between the second pole layer 528 and the first pole layer 524.

A magnetic head 500, as illustrated for example in FIG. 5, includes a magnetic core 524 having an air gap therein 526 and having a coil 540 wound thereon. The magnetic cores may vary in effective magnetic widths due to their design and due to the manufacturing process. These physical variations among the magnetic heads 500 result in variations in servo gain when they are individually connected in the servo loop.

Nevertheless, according to the present invention, a method and apparatus is provided for reducing the servo position error signal non-linearity during self-servo writing irrespective of the head width. The operation of the present invention will be described with reference to the circuit block diagram of FIG. 4 described above and the flow chart of FIG. 6.

The drive controller 466 or drive electronics 468 as shown in FIG. 4 provides a predetermined write current 469 to the heads 416 based upon the particular head width the write current is being applied to. The drive controller 466 first measures the write width of the heads 416 and a mean head width for the drive is determined using the measurements. The write current is then adjusted to a predetermined level so that a higher write current is applied to heads smaller than the mean head width and a lower write current is applied to heads wider than the mean head width. The predetermined level establishes the mean track propagation. The drive controller 466 performs a verification routine to verify that optimal performance is achieved using the adjusted write currents. The verification may include repeating the measuring and adjusting until a track propagation for the disk drive 400 meets a predetermined criteria. The predetermined criteria may include a predetermined minimum threshold or a minimum variance in track propagation width.

Figure 6:
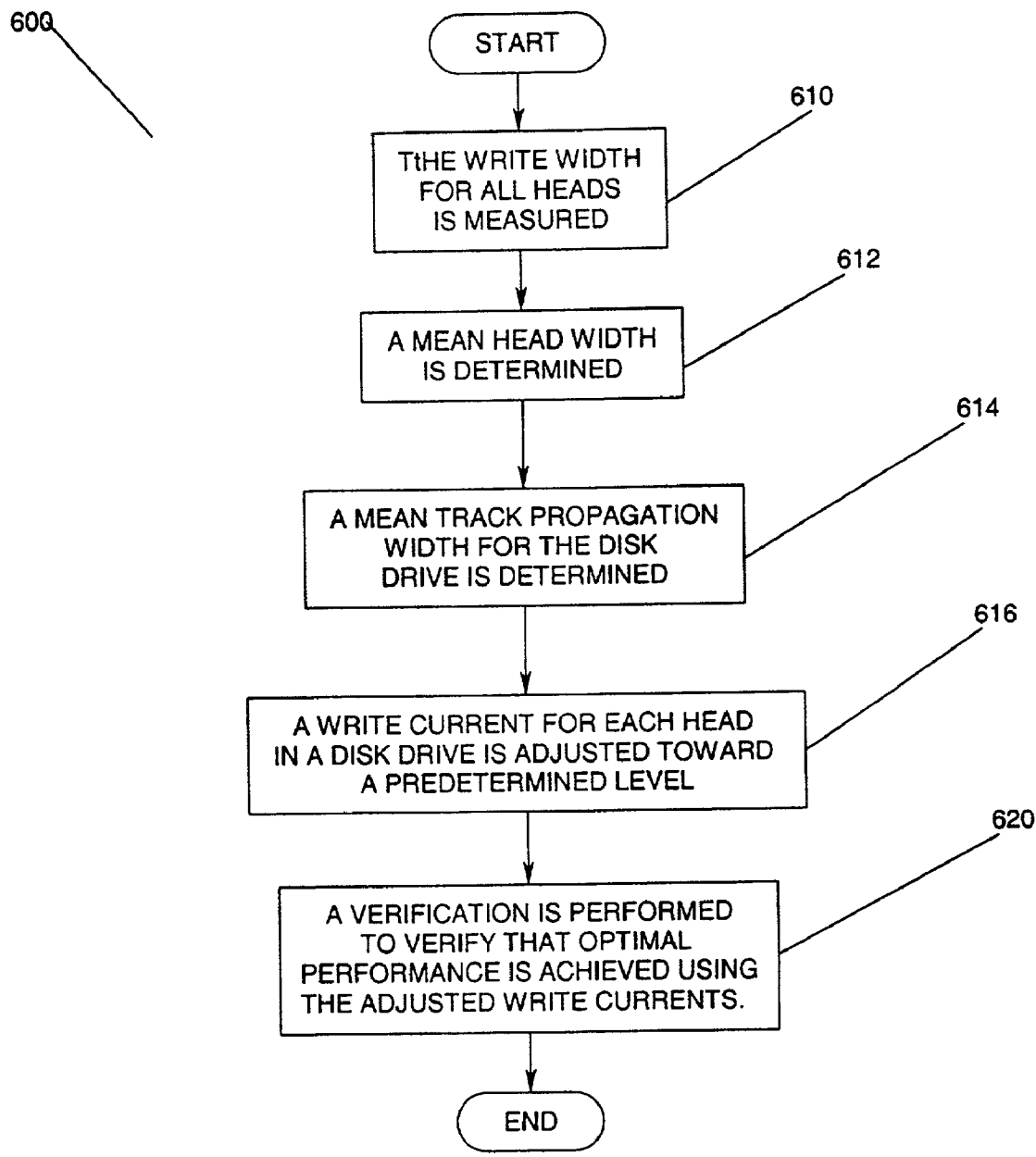
FIG. 6 illustrates a flow chart for performing the method for reducing the servo position error signal non-linearity during self-servo writing irrespective of the head width according to the present invention.

FIG. 6 illustrates a flow chart for performing the method for reducing the servo position error signal non-linearity during self-servo writing irrespective of the head width according to the present invention. First the write width for all heads is measured 610. A mean head width is determined 612. A mean track propagation width for the disk drive may also be determined 614. Then, a write current for each head in a disk drive is adjusted toward a predetermined level 616. The write current may be adjusted so that a higher write current is applied to heads smaller than the mean head width and a lower write current is applied to heads wider than the mean head width. The predetermined level establishes a mean track propagation. A verification 620 is performed to verify that optimal performance is achieved using the adjusted write currents. The verification may include repeating the measuring and adjusting until a track propagation for the disk drive meets a predetermined criteria. The predetermined criteria may include a predetermined minimum threshold or a minimum variance in track propagation width.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for reducing the servo position error signal non-linearity during self-servo writing, comprising:
   measuring a write width for all of a plurality of heads in a disk drive; and
   adjusting a write current for each head in a the disk drive toward a predetermined level;
   wherein the measuring further comprises determining a mean head width and the adjusting further comprises adjusting the write current for each head by applying a higher write current to heads smaller than the mean head width and a lower write current to heads wider than the mean head width.

2. The method of claim 1 further comprising determining a mean track propagation width for the disk drive, the predetermined level establishing the a mean track propagation.

3. The method of claim 1 further comprising verifying the optimal performance is achieved using the adjusted write currents.

4. The method of claim 3 wherein the verifying further comprises repeating the measuring and adjusting until a track propagation for the disk drive meets a predetermined criteria.

5. The method of claim 4 wherein the predetermined criteria comprises a predetermined minimum threshold.

6. The method of claim 4 wherein the predetermined criteria comprises a minimum variance in track propagation width.

7. A disk drive, comprising:
   a plurality of data storage media mounted for simultaneous rotation about an axis;
   an actuator for moving each of a plurality of heads relative to associated data storage media for reading and writing data to the associated data storage media, and
   a disk controller for writing a data pattern to respective data storage media utilizing each of the plurality of heads, wherein the disk controller measures the write width for each of the plurality of heads and adjusts a write current for each of the plurality of heads toward a predetermined level;
   wherein the disk controller measures the write width for each of the plurality of heads by determining a mean head width and adjusting the write current for each of the plurality of heads by applying a higher write current to heads smaller than the mean head width and a lower write current to heads wider than the mean head width.

8. The disk drive of claim 7 wherein the disk controller determines a mean track propagation width for the disk drive, the predetermined level establishing a mean track propagation.

9. The disk drive of claim 7 wherein the disk controller further verifies that optimal performance is achieved using the adjusted write currents.

10. The disk drive of claim 9 wherein disk controller verifies that optimal performance is achieved by repeating the measuring and adjusting until a track propagation for the disk drive meets a predetermined criteria.

11. The disk drive of claim 10 wherein the predetermined criteria comprises a predetermined minimum threshold.

12. The disk drive of claim 10 wherein the predetermined criteria comprises a minimum variance in track propagation width.

\* \* \* \* \*